United States Patent
Scholler et al.

(10) Patent No.: US 11,375,387 B2
(45) Date of Patent: Jun. 28, 2022

(54) METHOD FOR FEDERATING AT LEAST TWO COMMUNICATION NETWORKS FOR MOBILE TERMINALS AND NETWORK CAPABLE OF BEING FEDERATED

(71) Applicant: AIRBUS DEFENCE AND SPACE SAS, Toulouse (FR)

(72) Inventors: Franck Scholler, Saint Germain en Laye (FR); Jean-François Perez, Toulouse (FR); Jean-Marc Montenot, Voisins le Bretonneux (FR); Wannes Vossen, Saint-Orens-de-Gameville (FR)

(73) Assignee: AIRBUS DEFENCE AND SPACE SAS, Toulouse (FR)

( * ) Notice: Subject to any disclaimer, the term of this patent is extended or adjusted under 35 U.S.C. 154(b) by 0 days.

(21) Appl. No.: 17/050,697

(22) PCT Filed: Apr. 26, 2019

(86) PCT No.: PCT/EP2019/060705
§ 371 (c)(1),
(2) Date: Oct. 26, 2020

(87) PCT Pub. No.: WO2019/207090
PCT Pub. Date: Oct. 31, 2019

(65) Prior Publication Data
US 2021/0243615 A1   Aug. 5, 2021

(30) Foreign Application Priority Data
Apr. 27, 2018 (FR) .................. 1853759

(51) Int. Cl.
| | | |
|---|---|---|
| *H04W 24/02* | (2009.01) |
| *H04W 76/15* | (2018.01) |
| *H04W 8/02* | (2009.01) |
| H04W 84/20 | (2009.01) |
| *H04W 88/16* | (2009.01) |
| H04W 84/00 | (2009.01) |

(52) U.S. Cl.
CPC ............ *H04W 24/02* (2013.01); *H04W 8/02* (2013.01); *H04W 76/15* (2018.02); *H04W 84/005* (2013.01); *H04W 84/20* (2013.01); *H04W 88/16* (2013.01)

(58) Field of Classification Search
CPC ....... H04W 24/02; H04W 8/02; H04W 76/15; H04W 84/20; H04W 88/16; H04W 84/005; H04W 84/18; H04L 41/0803
See application file for complete search history.

(56) References Cited

U.S. PATENT DOCUMENTS

| | | |
|---|---|---|
| 2014/0254430 A1 | 9/2014 | Pison |
| 2015/0257051 A1 | 9/2015 | Rao et al. |

OTHER PUBLICATIONS

International Search Report as issued in International Patent Application No. PCT/EP2019/060705, dated May 24, 2019.

*Primary Examiner* — Nam T Huynh
(74) *Attorney, Agent, or Firm* — Pillsbury Winthrop Shaw Pittman LLP

(57) ABSTRACT

A method for federating at least two communication networks for mobile terminals by establishing a dedicated link between the two networks and then configuring one of the networks to use elements of the other network, in particular the user database and the communication policy manager.

12 Claims, 5 Drawing Sheets

Figure 1:
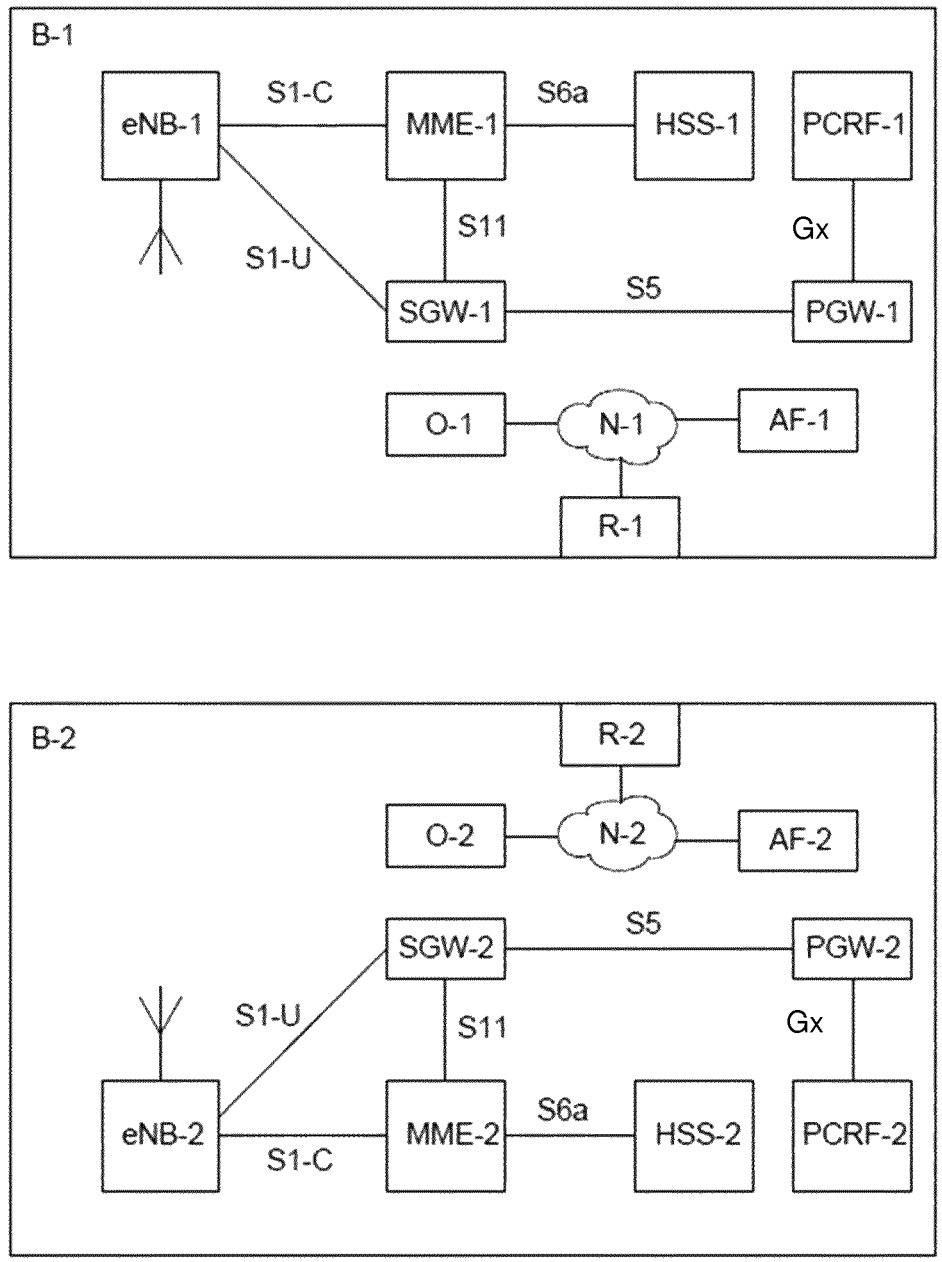

METHOD FOR FEDERATING AT LEAST TWO COMMUNICATION NETWORKS FOR MOBILE TERMINALS AND NETWORK CAPABLE OF BEING FEDERATED

CROSS-REFERENCE TO RELATED APPLICATIONS

This application is the U.S. National Stage of PCT/EP2019/060705, filed Apr. 26, 2019, which in turn claims priority to French patent application number 1853759 filed Apr. 27, 2018. The content of these applications are incorporated herein by reference in their entireties.

TECHNICAL FIELD OF THE INVENTION

The invention relates to a method for federating at least two communication networks for mobile terminals.

The field of the invention is notably that of tactical bubbles. More specifically, the field of the invention is that of the cooperation of at least two communication networks such as tactical bubbles.

The field of the invention is also that of the continuity of mobile access in operational theatres.

PRIOR ART

For sensitive mobile communications, means for making secure said mobile communications based on a public LTE network are known. Sensitive mobile communications are, for example:

Communications of law enforcement or civil security forces;
Military communications;
Communications of Operators of Vital Infrastructures, for example energy production installations;
Etc.

In the remainder of the document, intervention forces will be taken to mean forces such as those cited previously called upon to intervene in an operational theatre to resolve a crisis situation and the need to communicate in a secure manner in any place is critical for the correct resolution of the crisis situation.

In the prior art, communications having to be made secure are made by connection with a central orchestrator which protects for example access to a sensitive application. In addition, communications are made using encrypted tunnels. This solution enables all known users of the orchestrator:
To connect to sensitive applications,
To communicate with each other,
To move about while maintaining communications, it is in fact known to carry out an intracellular handover in a mobile network where the whole of the LTE structure is determined, which is the case of public or fixed networks.

In the prior art, secure communications are dependent on the availability of a public mobile network. Yet this network may be made unavailable for multiple reasons:
Destruction of part of the public infrastructure, in particular the radio part due to the visibility of base stations;
Saturation of the infrastructure, for example, when law enforcement forces intervene at a location, their presence and the reason for their presence is liable to arouse the curiosity and concern of persons present in the neighbourhood which is going to increase the flow of communications and lead to an over-consumption of communication resources;
Jamming of communications or attack against the public communication infrastructure;
Need to intervene in a zone not covered by the network public.

This problem is, in the prior art, partially addressed by the deployment of a tactical bubble. This deployment enables users of the tactical bubble to be independent of any other infrastructure for their communications.

Technical Problem

However, with solutions of the prior art, new problems appear.

Thus, intervention forces have at their disposal tactical bubbles consisting of a standalone LTE type mobile communication network enabling user equipment referenced on this tactical network to communicate with each other in the field in a standalone and secure manner.

Each bubble has at its disposal all of the equipment of an LTE type mobile telecommunication network, in particular the base station of the tactical bubble designated eNodeB according to LTE technology, the user database designated HSS (Home Subscriber Server) according to LTE technology, the PCRF equipment, the PGW (Packet Data Network Gateway) and SGW (Serving Gateway) serving gateways, the MME (Mobility Management Entity) entity and the AF (Application Function) entity enabling access to application servers. Each bubble manages its own fleet of user equipment, their access to radio resources and the putting in place of communications between them and to business applications, through its equipment. Each bubble is configured as exactly as possible as a function of the fleet of user equipment that it has to host which makes it possible to use equipment with reduced capacities compared to the equipment of a standard public mobile telecommunication network, thus making them displaceable and transportable more easily and at lower cost.

When several tactical bubbles of intervention forces are deployed in the field, these tactical bubbles may be brought to be positioned near to each other. This geographic proximity of tactical bubbles induces several problems:
The radio frequencies and the network identifier of these tactical bubbles being identical, their proximity causes interferences at the level of overlapping zones of the radio coverage, which adversely affect the quality of communications;
Each tactical bubble managing its own fleet of user equipment on a radio network of same nature and of same spectrum, a user equipment referenced in a bubble A found in the coverage zone of bubble B is going to try to hook up to bubble B without success because it is not referenced on bubble A and once broken off from the network of bubble A it can no longer reconnect automatically to the latter;
The tactical bubbles being able to have identical factory defined configurations (HSS having the same name, eNodeB parameterised in an identical manner for each bubble), this causes a certain number of network incoherencies when these bubbles are situated near to each other.

One of the solutions proposed by the prior art to resolve the problem consists in providing in the factory configuration of each tactical bubble the entire fleet of user equipment and the user profiles of intervention forces. Thus, when bubbles are near to each other, one of the bubbles is switched off so that the user equipment hooks up to the other tactical bubble maintained in operation. This approach has however several drawbacks:

Each bubble must be provided with the total number of user equipment managed by the intervention forces and thus requires equipment with the highest possible capacities for each tactical bubble thus very costly and more difficult to transport.

The switch over of the user equipment to the bubble maintained in operation induces the interruption of communications.

Finally, the switch over of the user equipment to the infrastructure of a single tactical bubble imposes sharing access to the application servers of this bubble with all the users of the network whereas in certain situations the application servers have to be dedicated to a tactical bubble and its access restricted exclusively to the users of this tactical bubble.

SUMMARY OF THE INVENTION

The invention provides a response to the aforesaid problems by making it possible to federate one or more mobile communication bubbles with each other when they are near to each other, while:

Guaranteeing the most exact dimensioning of each tactical bubble;

Ensuring the continuity of communications without interruption of service and their essential quality for critical communications (while putting in place the federation of bubbles with each other);

Maintaining, if need be, access to the application servers of each federated bubble for their respective users, and By putting in place the federation of bubbles in an entirely automatic manner without intervention of an operator.

Thanks to the invention, a first LTE type network and a second LTE type network may be deployed and connected together in such a way that:

The mobile terminals connected to the two networks can communicate with each other;

A terminal initially connected to the first network can connect to the second network and does not undergo loss of service or communication.

The invention thus enables handover between two networks that do not know each other a priori (that is to say, for example, two mobile bubbles which do not know their structure a priori).

In these cases at least one of the two networks is a tactical bubble.

In the present document a tactical bubble is a communication network for mobile terminals. Technically, a tactical bubble is a cellular network comprising at least one radio cell, a network core and an application or an interface with the exterior of the tactical bubble. A tactical bubble has the vocation of being mobile, at least displaceable as a function of communication needs. Seen from a user terminal a tactical bubble is an LTE (Long Term Evolution) network comprising a reduced number of base stations, usually a single base station. In other words, a tactical bubble represents a mini network similar to an operator network comprising a radio interface and making it possible to access applications.

In the present document, mobile communications are taken to mean communications made via mobile terminals of smartphone type using communication networks of LTE type or more recent. This type comprises processing devices using LTE modems. This type also includes connected smart objects. In particular they are communications being made via an intermediate infrastructure: the LTE network.

In this document it is said that two communication networks such as two tactical bubbles are federated, that is to say that a method is implemented making it possible to federate the radio modules and the network core elements of the two initial bubbles to make them function as a single LTE network.

Each bubble comprises an orchestrator which enables the federation of the tactical bubbles. Once the bubbles federated, group, video, data, applicative communications are possible in continuity in the entire zone covered by the tactical bubbles.

For example, for a situation requiring the intervention of a law enforcement team, for example the GIGN (French National Gendarmerie Intervention Group), and a civil security team, for example a firefighter team, each team only retains access to its specific applications (for example a police database, video servers, etc.), while allowing the other team to use its communication resources.

In the invention the two tactical bubbles are connected via a dedicated link. The bubbles agree on their role. One tactical bubble becomes master, the other slave. The election of a master bubble may be done according to several criteria, from first come first served to taking into account the hosting and processing capacities of each bubble (i.e. preferably the bubble capable of managing the greatest number of user equipment will be elected). This makes it possible, for example, to ensure that all the users will be correctly managed. The orchestrators of each tactical bubble carry out a mapping of the transmissions by reconfiguration of the networks and of the local link.

The local link between the two tactical bubbles may be established by Wi-Fi, LTE, that is to say a wireless connection. The local link may also be established by Ethernet or Fibre, that is to say a wired connection connecting the two tactical bubbles.

The invention thus relates to a method for federating a first communication network for mobile terminals and a second communication network for mobile terminals, each communication network comprising a base station, a mobility manager, a serving gateway, a user database, a communication policy manager, a packet gateway, each of said networks further comprising a router and an orchestrator, the method comprising the following steps:

Establishing a dedicated connection between the two communication networks by establishing a connection between the routers;

Electing a master orchestrator from among the orchestrators of the networks to federate, defining a master network and a slave network;

Updating the user database of the master network from the user database of the slave network;

Configuring the links between:
  The serving gateway of the master network and the mobility manager of the slave network;
  The serving gateway of the slave network and the mobility manager of the master network;
  The mobility manager of the master network and the mobility manager of the slave network;

Configuring the slave network so that it uses:
  The user database of the master network;
  The communication policy manager of the master network.

According to embodiments, the invention also has the following characteristics considered in all technically possible combinations:

Each communication network has the same addressing plan, the method comprising a step in which the router of each network is dynamically configured, by the orchestrator of its network, to carry out a reciprocal one to one address translation between the two networks;

The method comprises the following steps:
Updating each base station as a function of the neighbouring base station;
Updating the list of serving gateways of each network, each serving gateway being associated with a zone code as a function of its original network;
Updating each mobility manager as a function of the configuration of the mobility manager of the neighbouring network.

The establishment of the dedicated connection is done by the use of a connection means belonging to the list formed of at least:
A wire,
A wireless connection.

Communications made via the dedicated connection are made using a virtual private network.

The use, by the slave network, of elements of the master network is done by the configuration, in the slave networks, of secondary elements.

The configuration of secondary elements is done by naming, the resolution of names being configured by the orchestrator of the network at the moment of federation.

A communication network for mobile terminals is a standalone network bubble.

The election of the master orchestrator is done as a function of the processing capacities of the bubble to which the orchestrator belongs.

Access to the applicative functions of a bubble is maintained and is limited to its original users.

The invention also relates to a communication network for mobile terminals, designated first network, suited to being federated, with a second communication network for mobile terminals suited to being federated, a communication network for mobile terminals suited to being federated comprising a base station, a mobility manager, a serving gateway, a user database, a communication policy manager, a packet gateway, each communication network further comprising a router and an orchestrator, said first communication network being configured to:

Establish a dedicated connection with a second communication network by establishing a dedicated connection between the router of the first network and the router of the second network;

Elect a master orchestrator from among the orchestrators of the first and second networks to federate, defining a master network and a slave network;

Update the user database of the master network from the user database of the slave network;

Configure links between:
The serving gateway of the master network and the mobility manager of the slave network;
The serving gateway of the slave network and the mobility manager of the master network;
The mobility manager of the master network and the mobility manager of the slave network;
The packet gateway of the master network and the serving gateway of the slave network;

Configure the slave network so that it uses:
The user database of the master network;
The communication policy manager of the master network.

The communication network according to the invention may be a standalone bubble network.

LIST OF FIGURES

Figure 2:
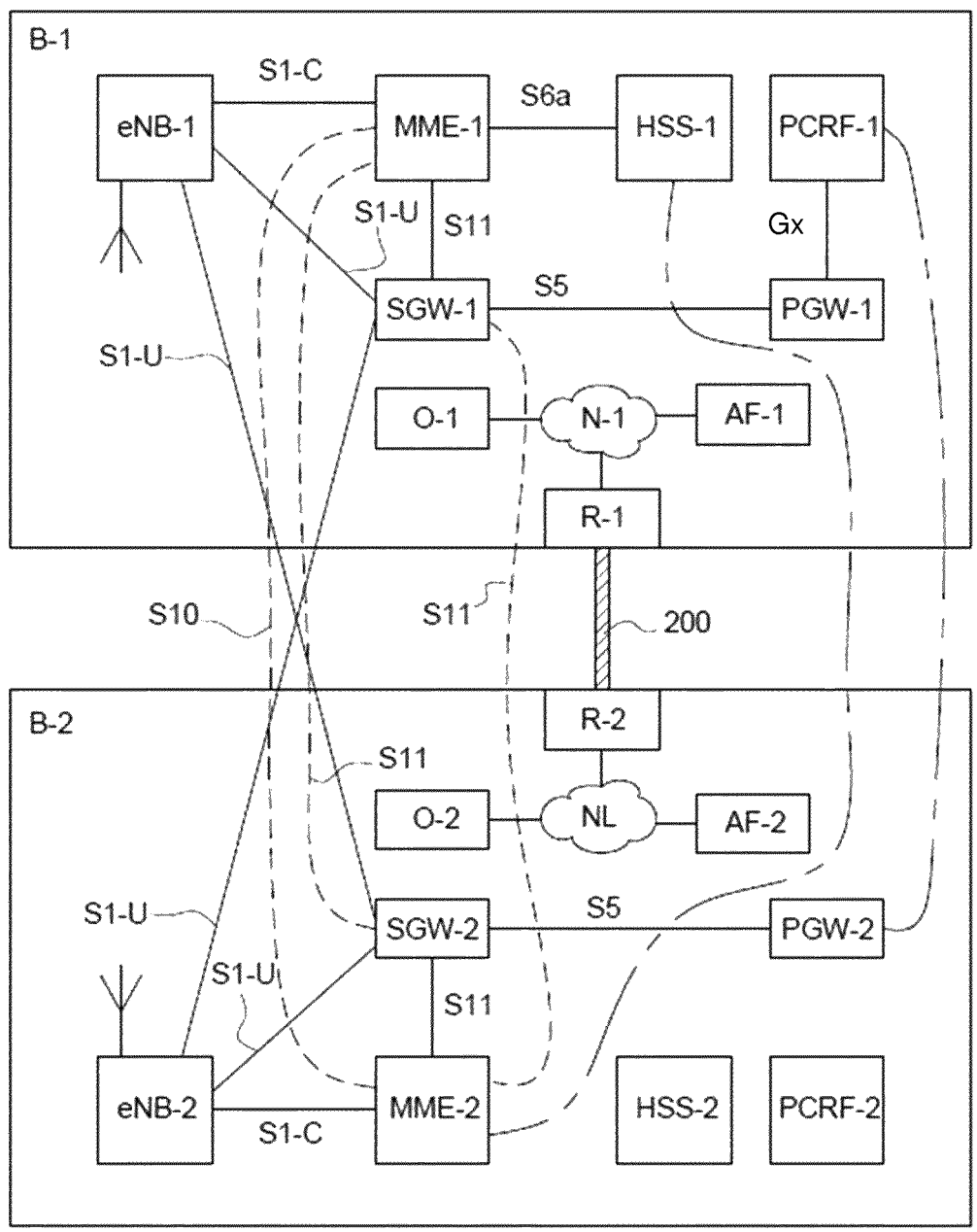
Figure 3:
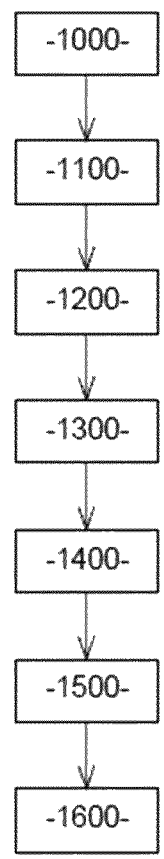
Figure 4:
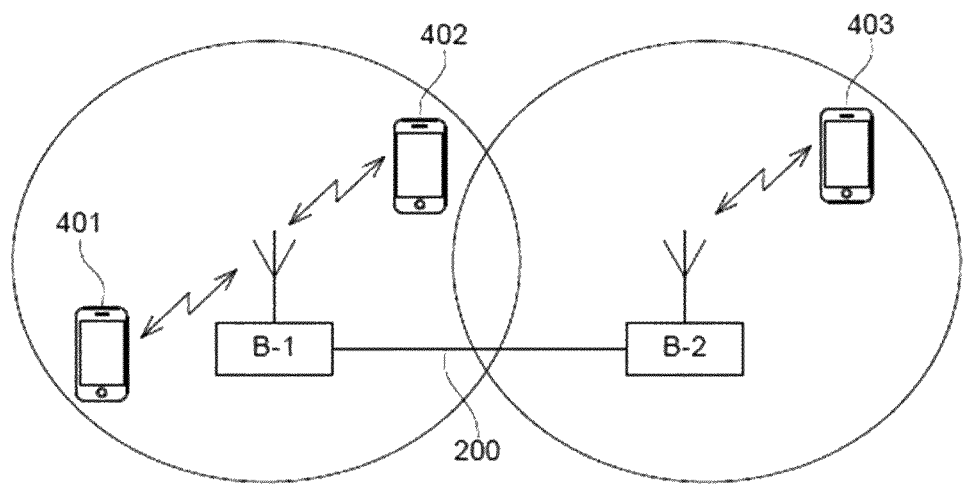
Figure 5:
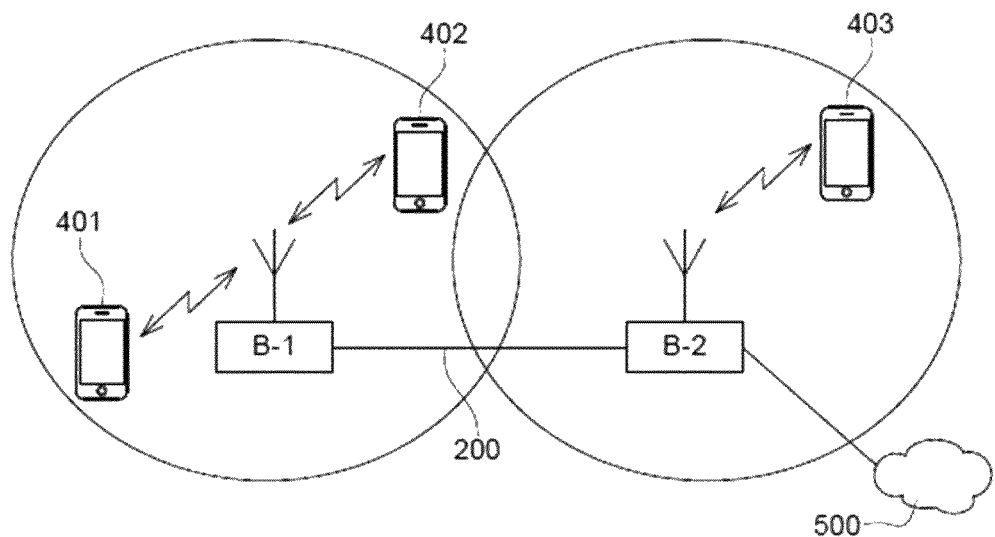
Figure 6:
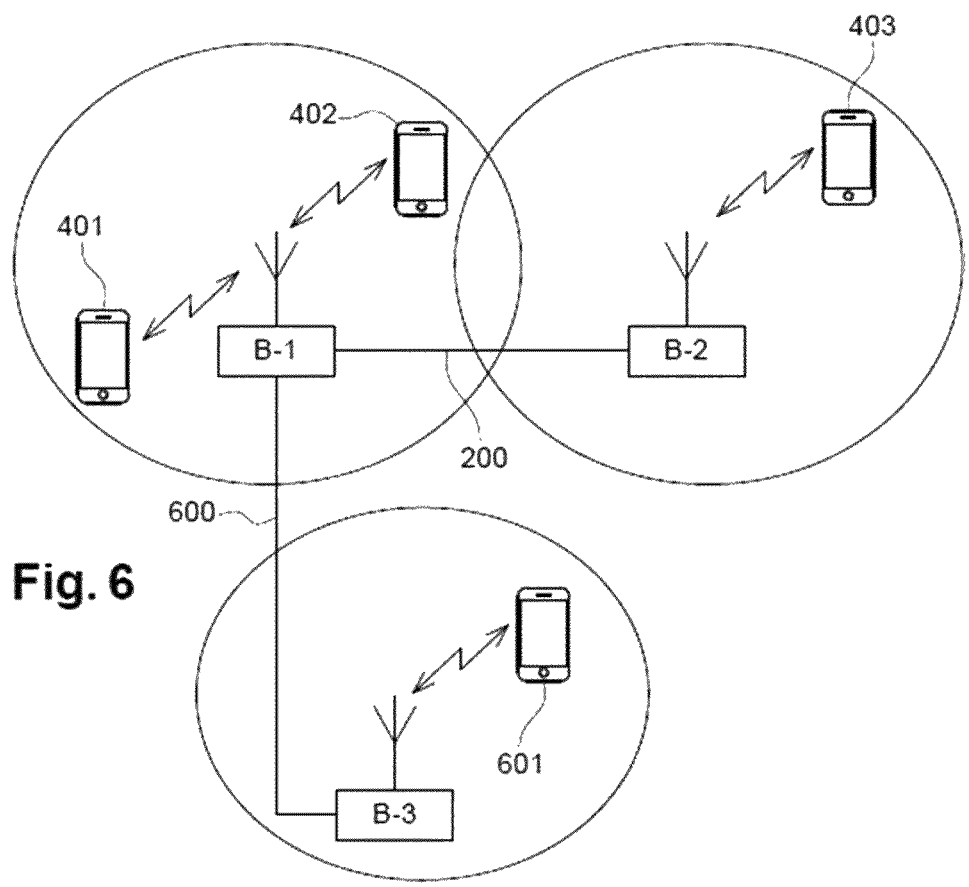
Figure 7:
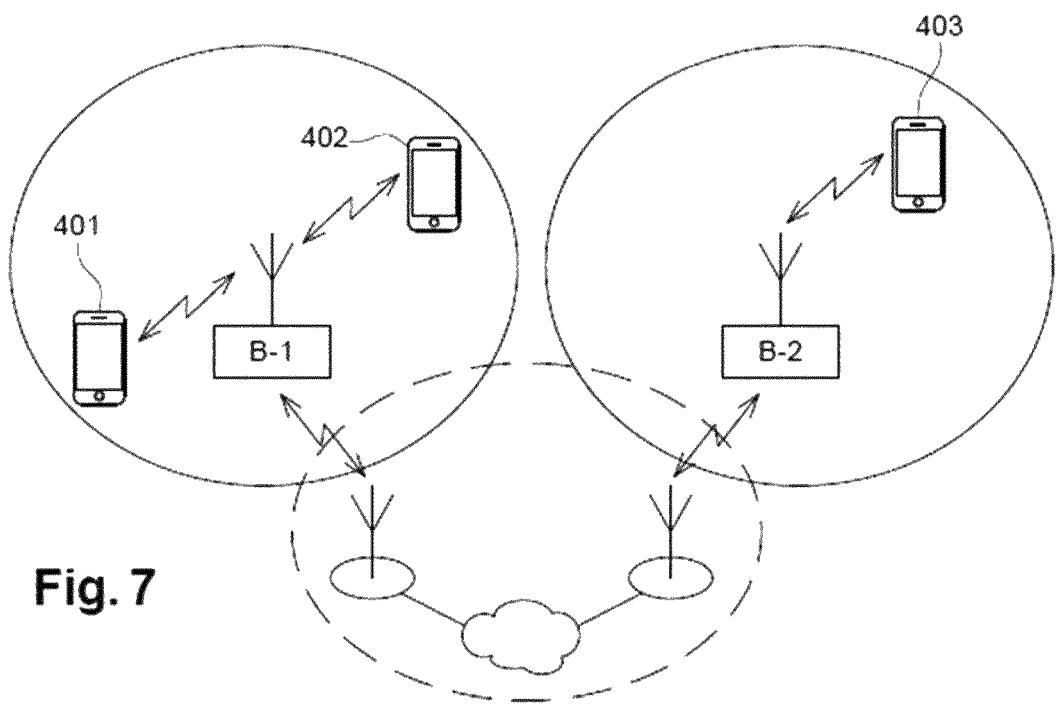

The figures are presented for illustrative purposes and in no way limit the invention. Different figures show identical elements with the same references. The figures show:

FIG. 1: a functional illustration of tactical bubbles to federate, before federation;

FIG. 2: a functional illustration of tactical bubbles to federate, after federation;

FIG. 3: an illustration of the steps of the method according to the invention;

FIG. 4: an illustration of the implementation of the invention for two tactical bubbles;

FIG. 5: an illustration of the implementation of the invention for two tactical bubbles of which one proposes access to an external network;

FIG. 6: an illustration of the implementation of the invention for three tactical bubbles;

FIG. 7: an illustration of a federation according to the invention via a third party LTE network.

DETAILED DESCRIPTION OF THE INVENTION

FIG. 1 shows a first tactical bubble B-1. In the implementation described the considered networks are LTE networks. The first tactical bubble B-1 comprises:

A first evolved base station eNB-1,

A first mobility manager, or MME for "Mobility Management Entity". This first mobility manager is referenced MME-1;

A first serving gateway, or SGW for "Serving Gateway". This first serving gateway is referenced SGW-1;

A first user database, or HSS for "Home Subscriber Server", that is to say a central database which contains information relative to the users of the first tactical bubble. This first user database is referenced HSS-1;

A first packet gateway, or PGW for "PDN Gateway", that is to say a PDN (Packet Data Network) gateway. This first packet gateway is referenced PGW-1;

A first communication policy manager, or PCRF for "Policy and Charging Rules Function", that is to say a manager that functions in the network core and makes it possible to access subscriber databases and other specialised functions, such as a flow management system. This first communication policy manager is referenced PCRF-1.

In this document each element described designates a device, real or virtual, provided with data processing and communication capacities. Such a device executes instruction codes recorded in a programme memory of said device as a function of parameters. These parameters are either recorded in a data memory of said device, or received during a communication made by said device.

It is noted that a same device may fulfil several functions.

FIG. 1 shows that the first tactical bubble B-1 comprises a first network N-1 enabling the interconnection of the elements of the first bubble. In particular, the first network enables the establishment of the links enabling the different elements to play their roles in making available an LTE network via the first base station. Such a network is, among others, described by the 3GPP TS 23.401 standard defining the specifications for the "General Packet Radio Service (GPRS) enhancements for Evolved Universal Terrestrial Radio Access Network (E-UTRAN) access". Thus, FIG. 1 also shows:

A first S1-C type link between the first base station eNB-1 and the first mobility manager MME-1;
A first S1-U type link between the first base station eNB-1 and the first serving gateway SGW-1;
A first S11 type link between the first mobility manager MME-1 and the first serving gateway SGW-1;
A first S6a type link between the first mobility manager MME-1 and the first user database HSS-1;
A first S5 type link between the first serving gateway SGW-1 and the first packet gateway PGW-1;
A first Gx type link between the first communication policy manager PCRF-1 and the first packet gateway PGW-1.

FIG. 1 also shows that the first tactical bubble B-1 comprises, connected to the first network N-1:

A first orchestrator referenced O-1. A programme memory of the first orchestrator comprises instruction codes for the implementation of the method according to the invention described hereafter;
A first router referenced R-1;
A first application server, referenced AF-1.

The presence of the first application server corresponds to an alternative of the invention in which the first processing bubble is provided with business processing capacities. From this point of view the presence, or the absence, of an application server does not decrease or increase the capacity of bubbles according to the invention to be federated. From the point of view of bubble federation, the presence of an application server is thus optional.

The functions of orchestrator, within the scope of the invention, are:

To ensure the discovery mode of the bubbles to federate.
To identify the master orchestrator and the slave orchestrator;
To set up a secure connection between the two bubbles;
To backup the configuration before federation at the level of the master bubble (user base image, configuration of elements of the network core, etc.);
To recover or synchronise the user data of the slave bubble;
To put in place the communication interfaces between the equipment of the slave bubble and of the master bubble.
Once the parameterisation done, to cut the links with supernumerary elements;
When the bubbles move away from each other, to return to the original configuration.
A watchdog mechanism consists in carrying out a message exchange between the two orchestrators of heartbeat or keepalive type. After a predefined duration without heartbeat, each orchestrator reconfigures all of the equipment of its bubble by taking the opposite route to federation.
In particular, the master orchestrator performs a restoration of the image of the master user database before federation.

The first tactical bubble such as described is thus a standalone network bubble. That is to say that the first tactical bubble suffices in itself to enable users to communicate with each other. Such a bubble is in addition transportable, that is to say that it can be deployed in any geographic position.

The plan for addressing elements of the first tactical bubble is static and predetermined.

A tactical bubble is thus composed of at least of an EPC (Evolved Packet Core), a HSS/PCRF pair and an eNodeB configured in an omnidirectional LTE cell.

FIG. 2 shows a second tactical bubble B-2 identical to the first tactical bubble. The second tactical bubble B-2 comprises:

A second evolved base station eNB-2;
A second mobility manager (MME-2);
A second serving gateway (SGW-2);
A second user database (HSS-2);
A second packet gateway (PGW-2);
A second communication policy manager (PCRF-2).

FIG. 1 shows that the second tactical bubble B-2 comprises a second network N-2 enabling the interconnection of the elements of the second bubble. In particular, the second network enables the establishment of links enabling the different elements to play their roles in making available an LTE network via the second base station eNB-2. Thus FIG. 1 also shows:

A second S1-C type link between the second base station eNB-2 and the second mobility manager MME-2;
A second S1-U type link between the second base station eNB-2 and the second serving gateway SGW-2;
A second S11 type link between the second service manager MME-2 and the second serving gateway SGW-2;
A second S6a type link between the second mobility manager MME-2 and the second user database HSS-2;
A second S5 type link between the second serving gateway SGW-2 and the second packet gateway PGW-2;
A second Gx type link between the second communication policy manager PCRF-2 and the second packet gateway PGW-2.

FIG. 1 also shows that the second tactical bubble comprises, connected to the second network:

A second orchestrator referenced O-2,
A second router referenced R-2;
A second application server, referenced AF-2. The remarks made for the first application server are also valid for the second application server.

The plan for addressing elements of the second tactical bubble is static and predetermined.

In an alternative of the invention, the two tactical bubbles have the same addressing plan. Communications between the two tactical bubbles are made via a reciprocal one to one NAT (Network Address Translation) at the level of the routers. Preferably, identical elements have the same home address but not the same network address. Thus, any local address of the equipment and applicative functions of each bubble is made unique by the putting in place on the exterior interface of the routers of a network address translation rule (NAT rule) being based on an identifier representative of the bubble.

In an initial state the second tactical bubble has been deployed and flows traffic enabling its users to communicate and to access the second application server via the user equipment connected to the second base station.

Following an evolution of the situation another tactical bubble is deployed to make it possible to deal with said evolution of the situation. This other tactical bubble is that having been described as the first tactical bubble. In a first instance, the first tactical bubble is in a blocked state, that is to say that it does not accept any communication, via the first base station, from users.

FIG. 3 shows a step 1000 of connection in which a dedicated connection is established between the first tactical bubble and the second tactical bubble. This dedicated connection may also be qualified as local. This connection is made between the first router and the second router. Physically this dedicated connection is either wired, or wireless. A wired connection is for example an Ethernet connection, a wireless connection is for example a Wi-Fi connection. In an alternative of the invention, this dedicated connection may also be made via a third party mobile network.

In an alternative of the invention, the establishment of the dedicated connection detected by the routers is followed by the establishment of an encrypted tunnel between these routers. Such a tunnel is called a VPN tunnel. Thus, all communications transiting via the two routers are encrypted and thus protected against potential interception. It involves the establishment of a virtual private network 200.

Once the dedicated connection established, one passes to a step 1100 of election of a master orchestrator. This election takes place following a mutual discovery. For example, such a discovery between orchestrators may be based on the multicast version of the Internet Protocol (IP) and on the notion of clusters. A multicast IP address is then known to all the bubbles able to be federated which makes it possible to join the cluster, which next organises itself.

The election of a master orchestrator is a process during which the tactical bubble comprising the master orchestrator becomes the reference tactical bubble of the federated communication network. That is to say, it is elements of the network core of this reference tactical bubble that are going to contain the whole of the configuration of the LTE network obtained by federation. According to different alternatives it is possible to envisage several election criteria:

Hosting capacity: it is the tactical bubble that has the largest hosting capacity that becomes the master bubble. Hosting capacity is the maximum number of terminal equipment that the bubble can manage simultaneously;

Processing capacity: generic capacity of the tactical bubble, this includes hosting and business power;

Date of deployment: the first bubble, or the last, according to a predetermined convention, becomes the master bubble;

By drawing of lots,

. . . the list is not limiting.

In our example, it is the first orchestrator that is elected master orchestrator.

It is during this step of election that the values of the identifiers of each network are also decided, as well as the zone identifiers used for searching for people (also designated paging).

It is also during this step that the reciprocal one to one address translation is put in place. In an alternative, the putting in place of this address translation is accompanied by updating of the recording in the name resolution directory to enable the designation of elements, for example the user database or the communication policy manager. For example, seen from the slave bubble, the database of the master bubble is attributed a name which may be resolved in its translated address. An alternative would be to use an address directly.

Thanks to this translation and to this resolution, it is also possible to maintain continuity of access to applicative servers whatever the bubble to which a user equipment is connected.

In practice, each tactical bubble having a unique identifier, the value of this identifier is generally used to derive the unique values of the other parameters of the tactical bubble, in particular the translated addresses, the zone identifiers, the unique identifiers of the mobility managers, etc. in the federation. It thus involves a parameterisation by convention. This solution is only a non-limiting example. This unique identifier is also used during discovery.

Once the master orchestrator elected, thus the master tactical bubble elected, one passes to a step 1200 of updating the user database of the master bubble. In this step the orchestrators dialogue to copy the content of the user database of the slave bubble in the user database of the master bubble. This enables the master tactical bubble to know all of the users capable of connecting. Each user is associated, in the user database, with its original bubble. This makes it possible, for example, to return to an initial state of the user database.

In an alternative embodiment, the master orchestrator performs a back up by image of the user database before the step 1200 of updating with the database of the slave bubble in order to be able to restore the user database to its configuration before the implementation of the federation method when the bubbles are brought to be no longer federated.

In an alternative, in this step the orchestrators also update the configuration of the communication policy manager by merging the configurations of the two communication policy managers. One then passes to a step 1300 of configuration of the links in which the orchestrators configure links, according to the LTE standard, to enable the elements of the two bubbles to operate together. These links are established through the address translation. Thus the orchestrators configure:

A S11 type link between the serving gateway of the master network SGW-1 and the mobility manager of the slave network MME-2;

A S11 type link between the serving gateway of the slave network SGW-2 and the mobility manager of the master network MME-1;

A S10 type link between the mobility manager of the master network MME-1 and the mobility manager of the slave network MME-2;

One then passes to a step 1400 of updating the base stations with a view to their cooperation in the federated communication network. That is to say that the base stations are made able to collaborate in a single communication network.

In this step, each base station is updated in order that the two base stations can collaborate on a handover. It is necessary that each base station knows at least the "eNode-BID", the PCI and the TAC of the other base station. These elements are known as "neighbourly relations".

eNodeBID: base station identifier;

PCI: Physical Cell Identity;

TAC: Tracking Area Code.

It is thus necessary that each base station has a certain number of unique parameters in the future federated network: eNodeBID and PCI (PCI orthogonal to limit radio interference). In practice, the value of these parameters is obtained by convention as described previously.

One then passes to a step 1500 of configuration of redundancies or, put another way, of configuration of the secondary elements in which the orchestrators reconfigure:

The mobility manager of the slave tactical bubble so that its secondary user database is the user database of the master tactical bubble;

The packet gateway of the slave tactical bubble so that its secondary communication policy manager is the communication policy manager of the master bubble.

This reconfiguration of the secondary elements is done either by declaring in the configurations an address, or a name. In a preferred alternative, a name is used that will be resolved in accordance with the actions of the preceding steps. The preceding steps are in particular the steps of putting in place the address translation and updating the recordings of name resolution directories. A secondary element is an element which is used, for example, in the event of unavailability of a main element.

These secondary configurations are put in place in a standard LTE network to ensure the resilience requirements of this type of network. In the case of the invention they are fictive means ("fictive" is taken to signify means diverted from their initial purpose) for the case of tactical bubbles. In the case of a normal network, these configurations are static and are not provided to be modified.

In the case of the invention, it is the orchestrators that dynamically control the change and the configuration of these links pointing to secondary equipment and applicative functions.

At the end of step 1500 of configuration of redundancies the orchestrators cut the links between:
- The mobility manager of the slave tactical bubble and the database server of the slave tactical bubble.
- The packet gateway of the slave tactical bubble and the communication policy manager of the slave tactical bubble.

These cuts cause the switch over to the secondary configuration and thus the use, by the elements of the slave bubble, of the user database of the master bubble and the communication policy manager of the master bubble.

This ends up in a federated network such as represented by FIG. 2. All of the users of the master and slave bubbles are recognised because the only user database known to the federated communication network is that in which the users of the slave bubble have been recopied.

In an alternative, the method according to the invention also comprises a step 1600 of synchronisation of the mobility managers and the server gateways so that they have knowledge of existing communication contexts and thus fluidify future intercellular handovers. This synchronisation also makes it possible to declare in each network the serving gateways and the mobility managers. In practice, in this step, it involves indicating to the mobility managers the existence of the tracking zone of the other bubble as well as the address or the name of the serving gateway which serves this tracking zone.

In the invention, if need be, the clocks of the two networks are synchronised.

At this stage it is possible to unblock the first tactical bubble, that is to say allow communications via the first tactical bubble. An LTE network federation has thus been carried out here, that is to say enabled two communication networks of LTE type, not knowing each other a priori, to function like a single communication network.

Since it remains possible to associate each user with its original tactical bubble it is also possible to control access to the application servers of the tactical bubbles and more generally to the resources of the tactical bubbles. It is thus possible to prohibit a user having a defined original tactical bubble to access the application servers of another bubble not being the original tactical bubble.

In an alternative of the invention all the users of all the federated tactical networks may have access to all the applicative functions (AF) of all the tactical networks. In another alternative, the users only have access to the applicative functions of their original tactical network. It is also possible to have all the boxes ticked.

The orchestrator plays the role of proxy for DNS type name resolution requests. Thus, during a request for access to applicative functions (AF) by a user equipment, a DNS request is transmitted to the orchestrator of bubble A which transmits it to an accessible name resolution server of DNS server type associated with bubble A. The latter sends back the IP address of the server on which the application is hosted to the orchestrator which sends it back to the user equipment.

The orchestrator acting as DNS proxy, the latter may respond differently by user for each DNS request sent by the user equipment.

The same is true for tactical bubble B.

During the federation of bubble A with bubble B, a synchronisation is carried out of the DNS contexts held by each orchestrator by handover of the DNS contexts of the slave bubble to the master bubble and vice versa. This operation may be carried out in step 1200 described previously.

The invention makes it possible to maintain segmentation of access to applicative functions between the user equipment of bubble A and those of bubble B. Indeed, a DNS request sent by a user equipment of bubble A, elected master bubble at the end of the federation step, will always be processed in the same manner as in the case where the bubble is standalone. Conversely, a DNS request of a user equipment of bubble B will be transmitted in a first instance to the orchestrator of bubble A which will be able to either carry out a name resolution to its own DNS server due to the synchronisation of the DNS contexts carried out during the federation or instead to relay the request to the orchestrator of the slave bubble as a function of the user equipment having sent the request.

The federation of two tactical bubbles has been described but it is entirely possible to carry out a federation between a tactical bubble and a communication network for mobile terminals of a fixed infrastructure. This makes it possible to guarantee that an intervention team will be able to communicate over the whole extent of the fixed infrastructure while being able to access its specific resources in its tactical bubble. These specific resources remain inaccessible to the original users of the network of the fixed infrastructure.

In practice, a federation of communication networks for mobile terminals is a communication network for mobile terminals. It is thus possible, thanks to the invention, to carry out a federation between a federated network and a communication network for mobile terminals. The invention is thus not limited to the federation of two networks. In other words, with the invention, it is possible to federate two or more communication networks for mobile terminals.

FIG. 4 shows the first tactical bubble B-1 and the second tactical bubble B-2 federated in a context of use. FIG. 4 shows:
- A first user equipment 401 connected to the first tactical bubble B-1;
- A second user equipment 402 connected to the first tactical bubble B-1
- A third user equipment 403 connected to the second tactical bubble B-2. The third user equipment is in addition out of range of the base station of the first tactical bubble.

In practice, the terminal equipment are smartphones or similar devices, that is to say devices able to connect to an LTE type network.

Thanks to the invention, the first user equipment, or the second user equipment, can establish communication with the third user equipment, which would be impossible without the invention. It can thus benefit from the union of radio coverages.

It is noted that it would be the same if the third mobile equipment was in range of the base station of the first tactical bubble. In this case it could, still thanks to the invention, use the base station of the first tactical bubble to connect to the federated network.

FIG. 5 is identical to FIG. 4 with in addition a connection between the second tactical bubble and an external network 500, for example the Internet network.

In this case, thanks to the invention, the first user terminal and the second user terminal can access the external network.

FIG. 6 is identical to FIG. 4 with in addition a third tactical bubble B-3 federated with the first tactical bubble B-1 via a dedicated link 600. FIG. 6 also shows a fourth user equipment 601 connected to the third tactical bubble B-3.

In this case, thanks to the invention, the third user equipment 403 can establish communication with the fourth user equipment 601.

FIG. 7 is identical to FIG. 4 except for the dedicated connection which is made via a wireless network. In the example of FIG. 7, it is an LTE type network but in practice it could be a Wi-Fi network. In this case, each tactical bubble connects to an LTE network via a base station of said LTE network. Once these connections established, the tactical bubbles can set up the VPN tunnel 200 through these connections.

The invention claimed is:

1. A method for federating a first communication network for mobile terminals and a second communication network for mobile terminals, each communication network comprising a base station, a mobility manager, a serving gateway, a user database, a communication policy manager, a packet gateway, each of said first and second communication networks further comprising a router and an orchestrator, the method comprising:
    establishing a dedicated connection between the first and second communication networks by establishing a connection between the routers;
    selecting a master orchestrator from among the orchestrators of the first and second networks to federate, defining a master network and a slave network;
    updating the user database of the master network from the user database of the slave network;
    configuring links between:
        the serving gateway of the master network and the mobility manager of the slave network;
        the serving gateway of the slave network and the mobility manager of the master network;
        the mobility manager of the master network and the mobility manager of the slave network;
    configuring the slave network so that the slave network uses:
        the user database of the master network;
        the communication policy manager of the master network;
    updating the list of serving gateways of each network, each serving gateway being associated with a zone code as a function of its original network, and updating each mobility manager as a function of the configuration of the mobility manager of the neighbouring network.

2. The method for federating communication networks according to claim 1, wherein each communication network has the same addressing plan, the method comprising a step in which the router of each network is dynamically configured, by the orchestrator of its network, to carry out a reciprocal one to one address translation between the two networks.

3. The method for federating communication networks according to claim 1, further comprising:
    updating each base station as a function of a neighbouring base station.

4. The method for federating communication networks according to claim 1, wherein the establishment of the dedicated connection is made by a use of a connection means belonging to the list formed of at least:
    a wire,
    a wireless connection.

5. The method for federating communication networks according to claim 1, wherein communications made via the dedicated connection are made using a virtual private network.

6. The method for federating communication networks according to claim 1, wherein a use, by the slave network, of elements of the master network is done by the configuration, in the slave networks, of secondary elements.

7. The method for federating communication networks according claim 6, wherein the configuration of the secondary elements is done by naming, the resolution of the names being configured by the orchestrator of the network at a moment of federation.

8. The method for federating communication networks according to claim 1, wherein a communication network for mobile terminals is a standalone network bubble.

9. The method for federating communication networks according to claim 1, wherein the election of the master orchestrator is done as a function of the hosting and processing capacities of the bubble to which the orchestrator belongs.

10. The method for federating communication networks according to claim 1, wherein access to the applicative functions of a bubble is maintained and is limited to its original users.

11. A first communication network for mobile terminals, suited to being federated, with a second communication network for mobile terminals suited to being federated, each communication network for mobile terminals suited to being federated comprising a base station, a mobility manager, a serving gateway, a user database, a communication policy manager, a packet gateway, each communication network further comprising a router and an orchestrator, said first communication network being configured to:
    establish a dedicated connection with the second communication network by establishing a dedicated connection between the router of the first communication network and the router of the second communication network;
    elect a master orchestrator from among the orchestrators of the first and second communication networks to federate, defining a master network and a slave network;
    update the user database of the master network from the user database of the slave network;

configure links between:
  the serving gateway of the master network and the mobility manager of the slave network;
  the serving gateway of the slave network and the mobility manager of the master network;
  the mobility manager of the master network and the mobility manager of the slave network;
  the packet gateway of the master network and the serving gateway of the slave network;
configure the slave network so that the slave network uses:
  the user database of the master network;
  the communication policy manager of the master network;
update the list of serving gateways of each network, each serving gateway being associated with a zone code as a function of its original network, and
update each mobility manager as a function of the configuration of the mobility manager of the neighbouring network.

12. A communication network according to claim 11, wherein the communication network is a standalone network bubble.

\* \* \* \* \*